April 11, 1939.   S. MINNECI   2,154,314
MOTOR CONTROL
Original Filed Dec. 20, 1935
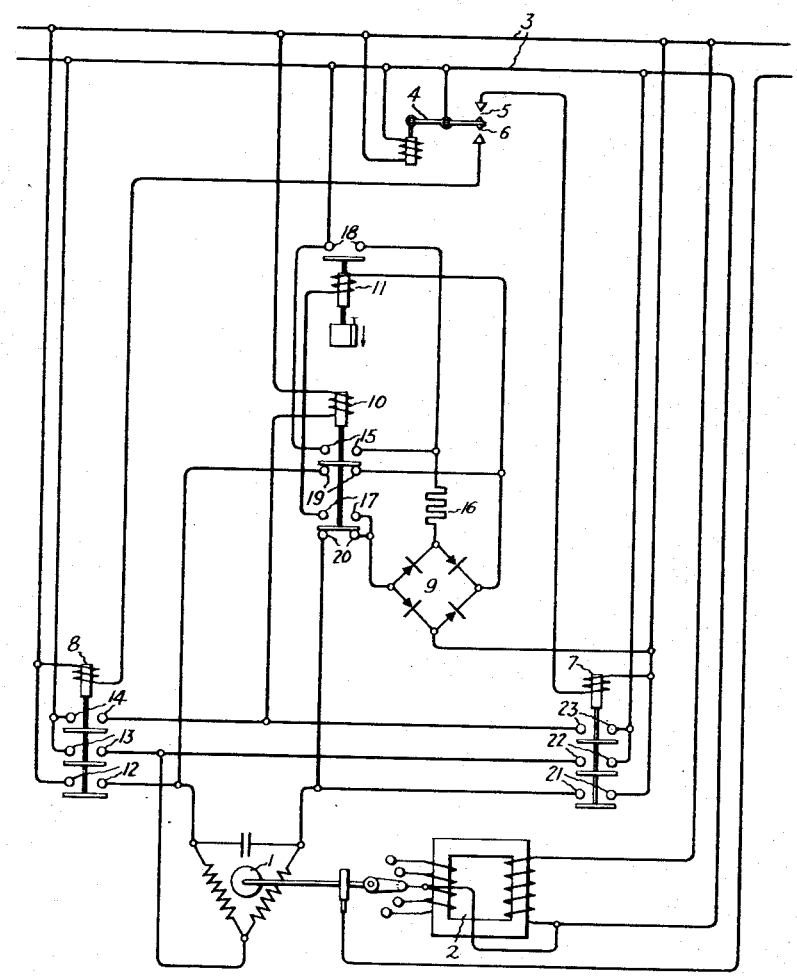
Inventor:
Salvatore Minneci,
by *Harry E. Dunham*
His Attorney Patented Apr. 11, 1939

2,154,314

UNITED STATES PATENT OFFICE 2,154,314

MOTOR CONTROL

Salvatore Minneci, Pittsfield, Mass., assignor to General Electric Company, a corporation of New York Application December 20, 1935, Serial No. 55,376
Renewed May 13, 1938

5 Claims. (Cl. 172—274)

My invention relates to motor control systems and more particularly to those systems in which an alternating current motor is dynamically braked through a rectifier under the control of a time delay drop-out relay.

Heretofore in such systems the motor has been adapted for operation in but one direction only and one of the motor terminals has been connected directly to an alternating current supply circuit so that a pulsating direct current, which I have found is not well adapted for dynamic braking purposes, has been passed through the motor windings.

In accordance with one feature of my invention I provide a novel motor control system of the above type in which the motor is readily reversible. In accordance with another feature of my invention I provide that the motor is dynamically braked through a full wave rectifier, by means of which quick and positive dynamic braking is secured. In accordance with additional features of my invention the rectifier is energized continuously while the motor is running and momentarily neither the direct current or the alternating current is applied to the motor during that period between which the alternating current supply is removed and the direct current is applied. During this period the motor is completely disconnected from the alternating current supply circuit.

My invention is applicable to any kind of alternating current motor whether single phase or polyphase, so long as a dynamic braking current will be induced in one winding by the relative rotation with respect thereto of another winding carrying direct current.

An object of my invention is to provide a new and improved motor control system.

Another object of my invention is to provide a new and improved system of dynamically braking a motor through a rectifier under the control of a time delay drop-out relay.

My invention will be better understood from the following description taken in connection with the accompanying drawing and its scope will be pointed out in the appended claims.

Referring now to the single figure of the accompanying drawing, it will be seen that I have shown diagrammatically an embodiment of my invention as applied to a capacitor motor 1. A capacitor motor is a particular form of induction motor in which a capacitor is utilized for phase splitting purposes so as to give the motor self-starting characteristics when energized by a single-phase alternating current supply circuit. Such motors are well known in the art. At this point I wish to call attention to the fact that a system for electric braking, and particularly dynamic braking, of a reversible capacitor motor is disclosed and broadly claimed in a pending application, Serial No. 55,381, filed concurrently herewith in the name of Harry R. West and assigned to the assignee of the present application. As an example of an application in which it is desirable that such a motor be selectively controllable for operating in either direction and also capable of rapid braking, I have shown motor 1 mechanically connected to operate a regulator 2. This regulator may be of any well known type and is illustrated, by way of example, as a single-phase step voltage regulator connected to regulate the voltage of an alternating current feeder circuit 3. In order that the system will respond automatically to changes in voltage on circuit 3, there is shown an electro-responsive control device 4 which is illustrated by way of example as a contact-making voltmeter. This device is connected across the circuit 3 and has a set of "raise" contacts 5 which will be closed when the voltage of circuit 3 falls below a predetermined normal value by a predetermined amount and has another set of "lower" contacts 6 which will be closed if the voltage of circuit 3 rises above a predetermined normal value by a predetermined amount. As it is usually impractical for the relatively delicate raise and lower contacts of such an electro-responsive device to control directly the current of an operating motor, there are provided intermediate "raise" and "lower" relays 7 and 8. In such a system it is desirable that the motor be brought quickly to rest after a regulating operation has taken place so as to prevent any over regulation or hunting of the system. I obtain this braking action dynamically by means of a full wave rectifier 9, the connection of the alternating current input terminals of which to the alternating current circuit 3 and the connection of the direct current output terminals of which to the motor 1 are controlled by an auxiliary relay 10 under the control of the intermediate relays 7 and 8. The disconnection of the alternating current terminals of the rectifier from the alternating current circuit is controlled by a time delay drop-out relay 11.

The operation of the illustrated embodiment of my invention is as follows: With the parts in the positions shown in the drawing, the volt-age of circuit 3 is normal, the motor 1 is deenergized and the regulator 2 is at rest. Assume now that the voltage of circuit 3 should rise above the normal value by an amount sufficient to cause closure of the "lower" contacts 6 of the contact making voltmeter 4. The closure of contacts 6 completes a circuit for energizing intermediate relay 8 which consequently picks up and closes two sets of contacts 12 and 13 which connect the motor 1 across the circuit 3. The connection is such as to cause the motor 1 to run the regulator 2 in the direction to lower the voltage of circuit 3. Regulator 2 is essentially merely an autotransformer having shunt winding and a series tapped winding. By changing the taps on the series winding the voltage induced by the shunt winding in the series winding can be made to vary from zero to a maximum value in either direction.

The energization of intermediate relay 8 also causes closure of a third set of contacts 14 thereon which completes a circuit for energizing the auxiliary relay 10 from the main circuit 3. The energization of relay 10 causes it to energize the time delay relay 11 through the rectifier 9 as follows: From the main alternating current circuit 3, through a set of contacts 15 on relay 10, through a current limiting resistor 16, thence through a portion of the rectifier 9 to the winding of relay 11, thence through a second set of contacts 17 on auxiliary relay 10, through another part of the rectifier 9 and back to the main alternating current circuit 3. Time delay drop-out relay 11 therefore picks up closing a set of contacts 18 which contacts are in parallel with contacts 15 of relay 10.

As soon as the regulator 2 has restored the voltage of circuit 3 substantially to normal the contacts 6 separate thereby deenergizing the intermediate relay 8 which thereupon disconnects the motor 1 from the alternating current supply circuit and at the same time deenergizes the auxiliary relay 10. Relay 10 thereupon drops out at once and in turn causes the deenergization of the time delay drop-out relay 11 because of the opening of the contacts 17 of auxiliary relay 10. However, due to the time delay drop-out characteristics of relay 11 it stays closed for a predetermined time and therefore the rectifier 9 continues to be energized through the contacts 18 even though the contacts 15 on the auxiliary relay 10 have opened. Substantially simultaneously with the deenergization of the time delay drop-out relay 11 by the dropping out of the auxiliary relay 10 additional contacts 19 and 20 thereon close thereby completing a direct current dynamic braking circuit for the motor 1. This circuit is as follows: From the main alternating current circuit 3 through the contacts 18 of time delay drop-out relay 11, thence through the resistance 16, the rectifier 9, contacts 19, the windings of motor 1, contacts 20 of auxiliary relay 10, through the rectifier and back to the other side of the main alternating current circuit 3. This application of direct current to the windings of motor 1 produces a stationary field which results in a braking current being induced in the rotor of the motor 1. Consequently the motor 1 is very quickly decelerated and by proper setting of the time of drop-out of the relay 11 this relay may be made to open its contacts 18 at substantially the same time as the motor comes to rest. The system will then be restored to the condition shown in the drawing.

Time delay relay 11 may be of any suitable and well known type and although it has been illustrated as being provided with a dash-pot, the fact that it is energized by direct current makes the application of the type of time delay relay having a short-circuited damping winding thereon obvious to those skilled in the art.

Should the voltage of circuit 3 become too low, the "raise" contacts 5 will close thereby energizing the intermediate relay 7 which, when it picks up, will close sets of contacts 21 and 22 for connecting the motor 1 to the circuit 3 for reverse operation so that the regulator 2 then raises the voltage of circuit 3. Relay 7 is also provided with an additional set of contacts 23 which are in parallel with the contacts 14 of relay 8 and consequently when contacts 23 close they cause energization of the auxiliary relay 10 and of the time delay relay 11 through the rectifier 9, as has already been described in detail. When the voltage is restored to normal and the raise contacts 5 separate causing the intermediate relay 7 to drop out dynamic braking is applied in the same manner as was described above.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent in the United States is:

1. In a motor control system, in combination, a supply circuit, an alternating current capacitor motor having a pair of stator windings connected in series across a capacitor, means for connecting the connection point between said windings to one side of said circuit and selectively connecting opposite sides of said capacitor to the other side of said circuit, and dynamic braking means under the control of said connecting means for applying a direct potential across said capacitor immediately after said connecting means disconnects the connection point between said windings from said supply circuit.

2. In a motor control system, in combination, a supply circuit, an alternating current capacitor motor having a pair of stator windings connected in series across a capacitor, means for connecting the connection point between said windings to one side of said circuit and selectively connecting opposite sides of said capacitor to the other side of said circuit, and dynamic braking means under the control of said connecting means for applying by means of a rectifier a direct potential across said capacitor immediately after said connecting means disconnects the connection point between said windings from said supply circuit.

3. In a motor control system, in combination, a supply circuit, an alternating current capacitor motor having a pair of stator windings connected in series across a capacitor, means for connecting the connection point between said windings to one side of said circuit and selectively connecting opposite sides of said capacitor to the other side of said circuit, dynamic braking means under the control of said connecting means for applying by means of a full wave rectifier a direct potential across said capacitor immediately after said connecting means disconnects the connection points between said windings from said supply circuit, and time delay means for controlling the removal of said direct potential from across said capacitor.

4. In a system of motor control, in combination, an alternating current supply circuit, an alternating current motor, means for establishing running connections between said circuit and said motor, a full wave rectifier, a time delay drop-out relay, relay means responsive to the establishing of the running connections between said supply circuit and said motor for connecting the alternating current input terminals of the full wave rectifier across said supply circuit, said relay means also connecting the direct current output terminals of said rectifier to energize said time delay drop-out relay, said relay means being responsive to the breaking of said running connections for connecting said motor to the direct current output terminals of said rectifier and for deenergizing said time delay drop-out relay, and means controlled by said time delay drop-out relay for continuing the energization of said rectifier from said alternating current supply circuit for a predetermined time.

5. In combination, two sets of main control contacts, intermediate relays controlled respectively by said control contacts, an alternating current motor, an alternating current supply circuit, said intermediate relays controlling reversible running connections between said motor and said supply circuit, an auxiliary relay, connections for controlling the operation of the auxiliary relay in response to the operation of either one of the intermediate relays, a full wave rectifier, a time delay drop-out relay, said auxiliary relay when energized completing a circuit whereby said time delay drop-out relay is energized with direct current derived from said supply circuit through said full wave rectifier, said auxiliary relay when deenergized by the deenergization of both of said intermediate relays connecting said motor to be energized from the direct current derived from said alternating current supply circuit through said full wave rectifier, said time delay drop-out relay maintaining said last mentioned connection for a predetermined time.

SALVATORE MINNECI.